(12) United States Patent
King et al.

(10) Patent No.: US 10,949,974 B2
(45) Date of Patent: Mar. 16, 2021

(54) AUTOMATED PLANT DISEASE DETECTION

(71) Applicant: iUNU, Inc., Seattle, WA (US)

(72) Inventors: Matthew Charles King, Seattle, WA (US); Ethan Takla, Seattle, WA (US); Yajie Sun, San Jose, CA (US)

(73) Assignee: IUNU, INC., Seattle, WA (US)

( * ) Notice: Subject to any disclaimer, the term of this patent is extended or adjusted under 35 U.S.C. 154(b) by 23 days.

(21) Appl. No.: 16/394,815

(22) Filed: Apr. 25, 2019

(65) Prior Publication Data

US 2020/0279374 A1 Sep. 3, 2020

Related U.S. Application Data

(60) Provisional application No. 62/811,899, filed on Feb. 28, 2019.

(51) Int. Cl.
*G06K 9/00* (2006.01)
*G06T 7/00* (2017.01)
*G06K 9/46* (2006.01)

(52) U.S. Cl.
CPC .......... *G06T 7/0016* (2013.01); *G06K 9/4642* (2013.01); *G06K 9/4652* (2013.01); *G06T 2207/10024* (2013.01); *G06T 2207/30188* (2013.01)

(58) Field of Classification Search
CPC ............... G06K 9/4642; G06K 9/4652; G06K 9/00657; G06K 2209/17; G06T 2207/10024; G06T 2207/30188; G06T 7/00; G06T 7/0016; A01G 7/00
USPC .................................. 382/110, 103; 348/135
See application file for complete search history.

(56) References Cited

U.S. PATENT DOCUMENTS

2015/0027040 A1* 1/2015 Redden ............... A01M 21/043
47/1.3
2018/0137244 A1* 5/2018 Sorenson ............... G16H 30/20

OTHER PUBLICATIONS

Johnstone, M.; Chatterton, S.; Sutton, J.; Grodzinski, B. Photosynthesis, net carbon gain, and growth of hydroponic bell peppers (*Capsicum annuum* 'Cubico') following root infection by Pythium aphanidemiatum. Canadian Journal of Plant Pathology (2003), Ottawa, v.25, n. 4, p. 427 (Abstract).
Johnstone, M.; Yu, H.; Liu, W.; Leonardos, E.; Sutton, J.C.; Grodzinski, B. Physiological changes associated with Pythium root rot in hydroponic lettuce. Acta Horticulturae (2005), The Hague, v.635, p. 67-75.

(Continued)

*Primary Examiner* — Phuoc H Doan
(74) *Attorney, Agent, or Firm* — Han Santos, PLLC; Gloria M. Steinberg

(57) ABSTRACT

Disclosed is a technique for automatically performing disease detection using image processing. The technique includes receiving, from image capture devices, a first image depicting a first set of plants of a first unit and a second image depicting a second set of plants of a second unit. One or more metrics associated with the first and second sets of the plants are measured based at least on the images. At least one difference in the first and second sets of the plants is detected based at least on differences in the measurement for the one or more metrics associated with the first set of the plants and the second set of the plants. In response to detecting the at least one difference, additional images of the plants are requested from the one or more image capture devices to detect the presence of plant disease.

20 Claims, 12 Drawing Sheets

(56) References Cited

OTHER PUBLICATIONS

Johnstone, M.B.; Chatterton, S.; Sutton, J.C.; Grodzinski, B. Net carbon gain and growth of bell peppers, Capsicum annuum L. 'Cubico' following root infection by Pythium aphanidemiatum. Phytopathology (2005), St. Paul, v.95, n. 4, p. 354-361.

Sutton, J. C., Sopher, C. R., Owen-Going, T. N., Liu, W., Grodzinski, B., Hall, J. C., & Benchimol, R. Li, Etiology and epidemiology of Pythium root rot in hydroponic crops: current knowledge and perspectives. Summa Phytopathologica (2006) vol. 32, p. 307-321.

Tian-Ye Chen, Chang-Chi Chu, Glenn Fitzgerald, Eric T. Natwick, Thomas J. Henneberry (2004). Trap Evaluations for Thrips (Thysanoptera: Thripidae) and Hoverflies (Diptera: Syrphidae). Environmental Entomology (Oct. 1, 2004), vol. 33, Issue 5, p. 1416-1420.

\* cited by examiner

AUTOMATED PLANT DISEASE DETECTION

CROSS-REFERENCE TO RELATED PATENT APPLICATIONS

This application claims priority to U.S. Provisional Patent Application No. 62/811,899, filed Feb. 28, 2019, and entitled "RGB Camera Vision Based Automatic Plant Counting and Germination Analysis," which is hereby incorporated by reference in its entirety.

BACKGROUND

Disease management is a significant issue in all plant growing operations. From the functional perspective of a commercial grower, identification of plant diseases is critical in industrial horticultural operations to prevent losses in the yield and quantity of the agricultural product. Although plant diseases may be visually observable on the leaves, stem, and fruit, it is difficult to monitor the plant diseases manually on a large scale with multiple grow operations that may be spread over different locations. In some cases, it is costly and impractical to inspect and conduct various tests. Additionally, monitoring of health and disease on plant requires extensive knowledge, experience, and expertise for growers. As a result, information collected is generally of low fidelity, of dubious provenance, untimely, incomplete, and does not lend itself for determining a course of remedial action, let alone coordinate an operation-wide response. Disease detection and diagnosis is the first step in managing the problem, and early and precise detection and diagnosis offer significant advantages to mitigating the damage with corrective action.

BRIEF DESCRIPTION OF THE DRAWINGS

The detailed description is described with reference to the accompanying figures, in which the leftmost digit(s) of a reference number identifies the figure in which the reference number first appears. The use of the same reference numbers in different figures indicates similar or identical items.

DETAILED DESCRIPTION

Figure 1:
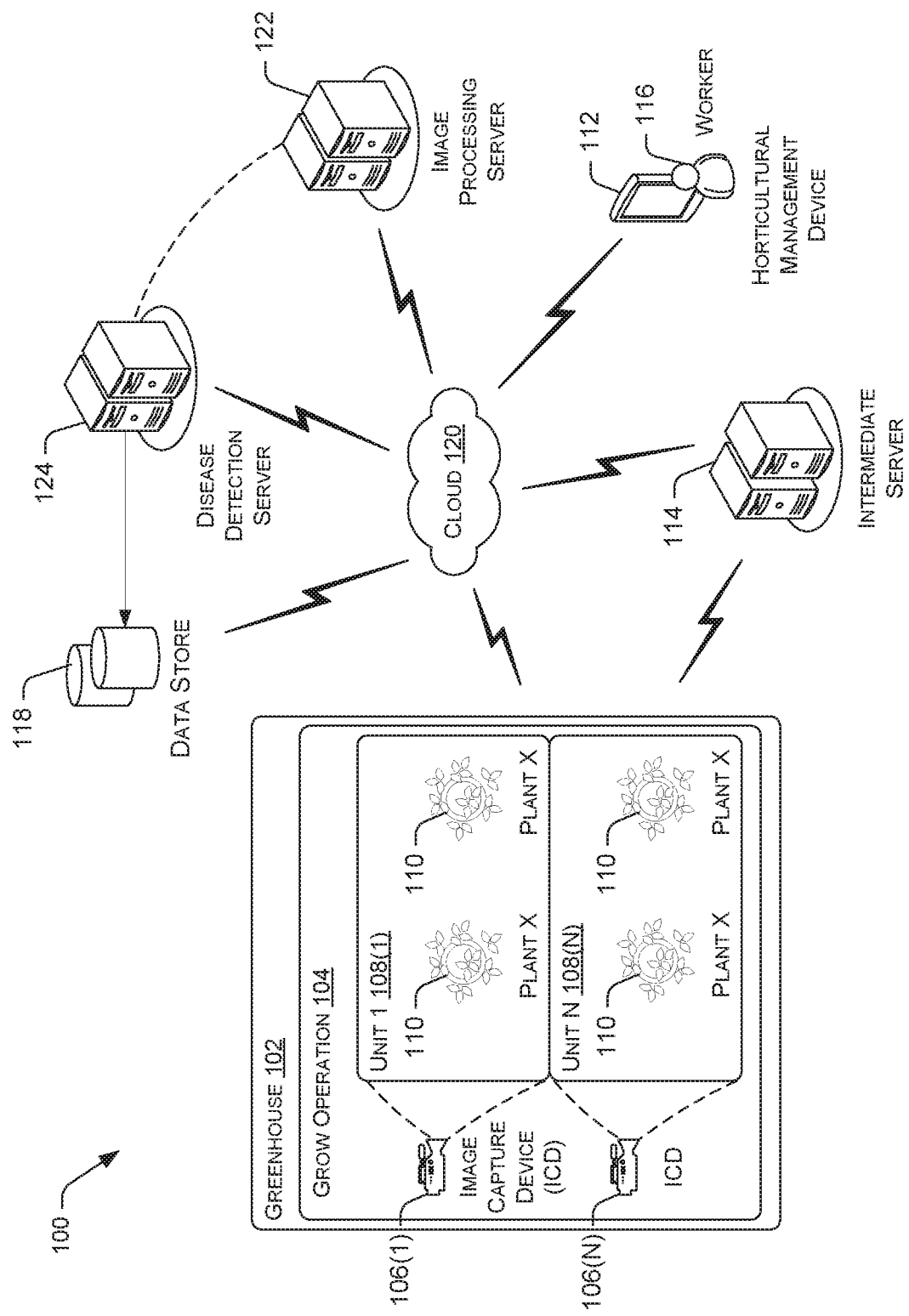
FIG. 1 is an example architecture for automatically performing disease detection using image processing techniques.

Disclosed is a technique for automatically performing disease detection using image processing techniques. In various embodiments, an image capture device such as a digital video camera, a still image digital camera, and/or via an unmanned aerial vehicle (UAV), may be used to take still images of plants or discretely defined group of plants periodically to regularly monitor the plants. The images may be collected, centralized, and then analyzed using computer object-recognition techniques and computer image analysis techniques to provide a critical mass of information for accurate automated detection and recommendations for remediation, which may be dispatched to workers operating in various locations.

The techniques described herein for providing an automated horticultural plant health diagnosis is two-fold. The first stage contains a set of signal and image processing analyses that are plant species and plant condition-invariant, and not related to changes in lighting conditions and environmental conditions, nor dependent on historical data. The second stage contains a set of image processing and machine learning analysis that are plant and condition specific, and related to changes in environmental conditions, or require historical data. Historical data provides noise reduction in calculating norms and the degree of variations in both unit and space specific metrics. The first stage generally functions as a feature extractor or a detector, and the second generally as a classifier. Each stage is a traditional or deep neural network resulting in independent and corroborating detection and classification of plant disease.

Because the detection stage does not depend on historical data, a plant may be compared to the growth performance of similar plants, or to the growth performance of other plants in the same horticultural operation in real-time. In this way, various tests for the presence of pathogens or infestation may not be required. Additionally, a critical mass of data may be aggregated to provide historical information relating to growth rates of plants that will allow for the identification of one or more potential plant diseases that are present. The identification of plant diseases can be used to determine potential remediation courses of action. Some analysis may make use of machine learning/big data techniques. The results of this analysis may then be used to improve future detection and remediation recommendations.

The computer object-recognition and computer image analysis techniques may also provide a detailed analysis of each plant. Furthermore, the computer image analysis techniques can include color analysis to detect changes in color, such as the premature browning, discoloration of leaves, or leaves curling. Moreover, because each plant is being monitored, sequential analysis, or the comparison of images over time, may be applied to capture changes of the same plant over time. The techniques described herein may be implemented in a number of ways. Example implementations are provided below with reference to the following figures.

Example Architecture

FIG. 1 provides an example architecture for automatically performing disease detection using image processing techniques. A horticultural operation may cover one or more locations, such as a greenhouse 102. A greenhouse 102 may have one or more grow operations 104 each with one or more plants 110. The plants 110 can comprise a single type of plant or multiple types of plants. In various embodiments, a single grow operation 104 may include multiple plants in different locations/greenhouses 102. Specifically, a grow operation 104 is a logical group of plants 110 that are similarly situated such that the cultivation of each plant in the group is substantially similar. In the illustrated example, the grow operation 104 includes one or more units 108(1)-108(N). A unit includes a group of plants 110. In a case of deep water hydroponic growing, a unit can be a group of plants on associated and contiguous rafts, called a batch, that is germinated, grown, and harvested together. In a case of greenhouses, a unit can be a group of plants on rollo-bon tables that can move from one location of a greenhouse to another location of the greenhouse.

One or more image capture devices 106(1)-106(N) are located at each grow operation 104 to capture images of plants 110 or discretely defined groupings of plants and information related to each plant 110. In some embodiments, each individual plant may have a single dedicated image capture device, such as one of the image capture devices 106(1)-106(N). The image capture devices 106(1)-106(N) may include a digital video camera or may be a still image camera configured to capture images periodically and/or on demand. The image capture device may also comprise a UAV that is configured to capture images periodically and/or on demand. Generally, the image capture devices 106(1)-106(N) may take visible light spectra pictures but may also extend to non-visible spectra such as infrared and ultraviolet. Each of the image capture devices 106(1)-106(N) may have an onboard application programming interface (API) enabling programmatic control. Accordingly, the image capture devices 106(1)-106(N) may use internal logic to capture images based on an analysis. Alternatively, the image capture devices 106(1)-106(N) may be networked thereby enabling remote control. The image capture devices 106(1)-106(N) may be controlled via an image capture function. The image capture function may be a part of the image capture device and/or a part of a luminaire feedback or combo device (not pictured).

In various embodiments, the image capture devices 106(1)-106(N) may transmit images and other information to an image processing server 122 for providing image processing services. In this regard, the image processing server comprises various modules and components for providing image processing services. For example, the image processing server 122 comprises an image retriever for acquiring images from one or more image capture devices 106(1)-106(N), a memory buffer, an image preprocessor, a classifier, an identifier, and an analysis module. The image processing server 122 can be used to implement the image capture function.

The architecture 100 further includes a horticultural management device 112 that is operated by a worker 116. The horticultural management device 112 may be any networked computer, including mobile tablets over Wi-Fi and/or mobile tablets over a cellular network and/or laptops. The horticultural management device 112 may include an image capture device for capturing images of the plants 110 in a grow operation 104. The horticultural management device 112 may connect to the cloud 120, directly to the disease detection services at the disease detection server 124, the image processing services at the image processing server 122, or directly to the grow operation 104, via an intermediate server 114 and/or other interfaces to monitor the grow operation 104.

In some instances, the intermediate server 114 may be used to store and/or queue the captured images and other information from the image capture devices 106(1)-106(N). The intermediate server 114 may implement an image flow controller to manage the acquisition and transmission of images from the image capture devices 106(1)-106(N).

In some instances, the image flow controller can locally manage received images, and potentially transmit the received images over a network. In this regard, the image flow controller may request acknowledgment to determine that the transmission was successful. The image flow controller may also transmit notifications to other devices subscribing to its notifications indicating the status of the transmission. The image flow controller may store a configuration setting of how many images the image capture devices 106(1)-106(N) are to capture, the resolution the image is to be captured, the format the image is to be stored, and any other processing to be performed on the image. The image flow controller may store a captured and/or received image in the memory buffer and designate the file name of the received image. The image flow controller may operate with other applications that may perform additional image processing, such as compression and/or encryption.

In some cases, the intermediate server 114 may be an on-premise or an off-premise server. In this regard, the intermediate server 114 may or may not be located at a grow operation 104. The intermediate server 114 may forward the captured images to the image processing server 122. The intermediate server 114 may directly send the captured images to the image processing services if the image processing server 122 and the intermediate server 114 are on the same network. Additionally, or alternatively, the intermediate server 114 may route the captured images to the image processing services via the Internet and/or the cloud 120. In other embodiments, the disease detection services may be hosted in a virtual machine on the cloud 120.

The cloud 120 may also be utilized to provide the services associated with the intermediate server 114, the image processing server 122, and/or the disease detection server 124. The intermediate server 114, the image processing server 122, and/or the disease detection server 124 may either be a physical dedicated server or may be a virtual machine. In the latter case, the cloud 120 may represent a plurality of disaggregated servers which provide virtual application server functionality and virtual storage/database functionality. The disaggregated servers may be physical computer servers, which may have a processor, a memory, an I/O interface and/or a network interface. The features and variations of the processor, the memory, the I/O interface and the network interface are substantially similar to those described for the host of the image capture function, the intermediate servers 114, the image processing server 122, and/or the disease detection server 124. Differences may be where the disaggregated servers are optimized for throughput and/or for disaggregation. Cloud services may be made accessible via an integrated cloud infrastructure. The cloud infrastructure not only provides access to cloud infra services but also to billing services and other monetization services. The cloud infrastructure may provide additional service abstractions such as Platform as a Service (PaaS), Plant Artificial Intelligence (AI) as a Service (PAaaS), Infrastructure as a Service (IaaS), and/or Software as a Service (SaaS), depending upon embodiments.

The processed images are routed to the disease detection services at the disease detection server 124, which may be a component of a neural network. The disease detection services may implement image processing techniques, depending upon embodiments. In some aspects, the disease detection services provide a two-fold approach where the first stage of analysis detects the potential presence of plant disease. Detecting the potential presence of a plant disease triggers the second stage analysis to identify the plant disease. Upon detecting a presence of plant disease and identifying the plant disease, such information may be subsequently sent to the grow operation 104, intermediate server 114, the horticultural management device 112, and/or other interfaces to monitor the grow operation 104. In some instances, one or more courses of action for remediation may be provided to a horticultural management device 112 that is operated by a worker 116 responsible for at least one grow operation 104 and/or a worker who is to perform the actual tasks comprising a course of action for remediation. In one embodiment, all or a portion of the course of action for remediation may be displayed in a horticultural management device 112 for view and interaction by the worker 116.

In some instances, the disease detection services may transmit to or request from the horticultural management device 112, information related to the identified plant disease. For instance, disease detection services can request additional growth measurements or images from the horticultural management device 112. If multiple horticultural management devices are used, the disease service can request additional information from a selected horticultural management device of a plurality of horticultural management devices based on one or more conditions, such as the real-time location of the horticultural management device 112 and/or the registered operator or user (i.e., the worker 116) of the horticultural management device 112. In this regard, one or more workers 116 can be provided with access to a horticultural management device 112.

In some instances, the captured image in the memory buffer of the image processing server 122 may be persisted and aggregated in the data store 118. The data store 118 can comprise a data management layer that includes software utilities for facilitating the acquisition, processing, storing, reporting, and analysis of data from multiple data sources such as the image capture devices 106(1)-106(N), the intermediate server 114, the horticultural management device 112, and/or so forth. In various embodiments, the data store 118 can interface with an API for providing data access.

Figure 2:
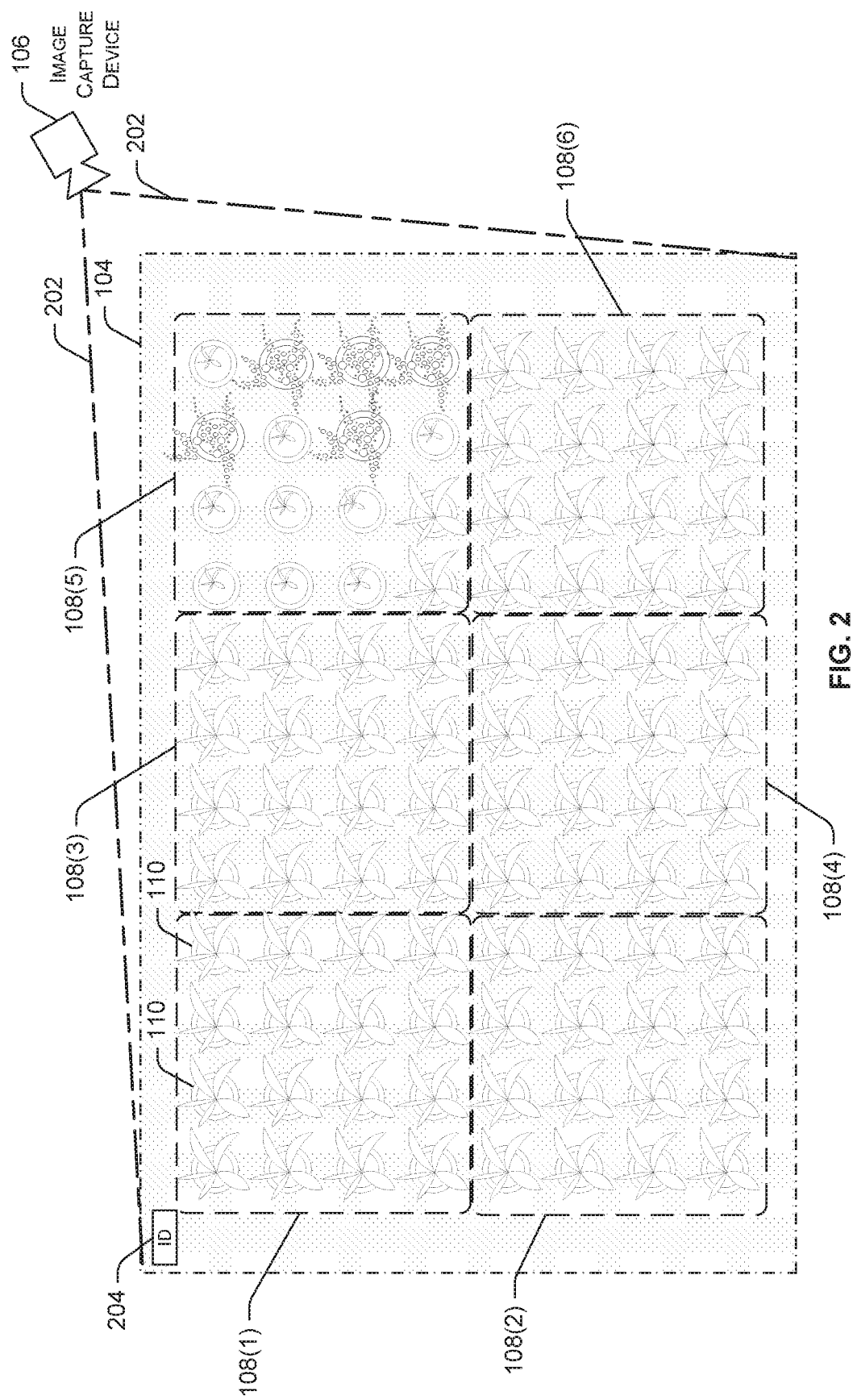
FIG. 2 is an example of a grow operation for conducting disease detection using image processing techniques.

FIG. 2 illustrates an overhead view of an example of a grow operation for conducting disease detection using image processing techniques. The grow operation 104 includes an image capture device 106, which may comprise a camera and/or one or more sensors (e.g., Light Detection and Ranging (LIDAR)). Thus, in one example, the image capture device 106 may be positioned near the grow operation 104 such that its cameras/sensors have a field of view 202 to ensure a complete and unobstructed view of the plants 110 in the individual units 108(1)-108(6) of the grow operation 104. In another example, the image capture device 106 may include a camera that is controlled by mechanical gimbal to allow automatic tracking of a target (e.g., a worker, a plant, a unit, etc.) with a narrower field of view. In yet another example, multiple image capture devices 106 may be positioned in various locations of grow operation 104 to provide multiple viewpoints.

The grow operation 104 may include a marker 204 associated therewith. In various embodiments, the marker 204 can include physical identifiers that are affixed to a location. The marker 204 may include one or more visual matrix codes, such as QR codes, Aztec Codes, Maxi Codes, or other visually-readable identifiers such as a barcode that provides the type of plant and/or a unique identifier of the particular plant that is located in the vicinity of the marker 204. In the illustrated embodiment, the marker 204 can include information about the plants 110 in the units 108(1)-108(6).

In some examples, the visual matrix codes may be analyzed after the image of the plants 110 in the units 108(1)-108(6) has been uploaded to an image processing server (not pictured). In other examples, the image capture device 106 may include a reader (e.g., barcode reader and/or QR code reader) to read the marker 204. Thus, in this example, the image capture device 106 may be configured to append the plant identification into metadata associated with each image depicting the plants 110 in the units 108(1)-108(6). In yet other examples, the marker 204 may include a radio-frequency identification (RFID) and/or near-field communication (NFC) tag. Thus, the image capture device may include an RFID reader and/or NFC reader to detect the marker 204 and append corresponding plant identification data into the captured image.

In operation, the image capture device 106 may be configured to capture one or more images of the individual units 108(1)-108(6) for comparison. Units may be physically grouped into spaces which share common environmental input and controls. In the instance of deep water hydroponics, space may be a lane, sharing the same body of water. In the case of rollo-bon table systems, space may be a row within the same greenhouse. The units 108(1)-108(6) may be logically defined. For instance, a unit may be a raft in hydroponics or a rollo-bon table in a greenhouse. The units 108(1)-108(6) may also be arbitrarily defined. For example, an operator may group one or more plants together to form a unit. In the illustrated embodiment, the individual units 108(1)-108(6) are substantially similar in shape and size, and in the number of plants 110. However, the units 108(1)-108(6) may not be uniform, depending upon embodiments.

In various embodiments, metrics that may be measured from the one or more images may be growth based or color based. Additionally, the metrics may comprise unit metrics or spatial aggregate metrics. Unit metrics are based on an analysis of unit images, which may be manually defined. For example, a greenhouse operator may use a geomarker system, which may comprise the marker 204. Composites are built from raw images and then segmented into unit images. In addition to unit metrics that can be directly aggregated at the space level, metrics may be specific to spaces which are measurements of the relationships and degree of variation between associated units. These metrics provide a real-time baseline to compare the degree of variation of a unit metric to the standard amount of variation within a space.

Growth based unit metrics include canopy coverage, flower count, flower size, flower clusters, germination count, germination size, and component shape. The canopy coverage is the metric of an area within the unit that is a leafy growth coverage or crop canopy. The flower count is the count of flowers, or fruit, within the unit. The flower count may be subdivided into a count of flowers, or fruit, of distinct states. The flower size is a geographically indexed list of flower or fruit sizes within the unit. The flower size may be subdivided into classes of flowers, or fruit, of distinct states. The flower cluster is a geographically indexed list of flower or a number of fruit clusters within the unit, where a cluster is defined as touching a neighbor. The germination count is a per unit count of germinated or sprouted plants for early plants. The germination size is a per unit germinated plant list of sizes for early plants. The component shape is a per unit, per plant, or plant component leaf or flower shape Hu moment, which is a metric of the shape of a young plant. Growth based unit metrics could also include shape metrics, such as the shape of leaves, shape of fruits, and shape of flowers when projected and imaged in a 2D image plane.

Color based unit metrics include canopy histogram, canopy K-means color and cluster size, and flower histogram. The canopy histogram is the histogram of color distribution within the canopy of the unit, which is a metric of overall color. The canopy K-means color cluster size is a sorted list of the size of groups, or bands, or colors within the canopy of the unit, which is a metric of the amount of each major color. The flower histogram is the histogram of color distribution within the flower, or fruit, of the unit, which is a metric of flower color. The flower histogram may be subdivided into classes of flowers, or fruits, of distinct states.

In addition to unit metrics that can be directly aggregated at the space level, there is also a set of metrics that are specific to spaces which are measurements of the relationships and degree of variation between associated units. These metrics provide a real-time baseline to compare the degree of variation of a unit metric to the standard amount of variation within a space. Growth based spatial aggregate metrics includes space specific growth homogeneity, space specific flower count homogeneity, space specific flower size homogeneity, space specific flower cluster homogeneity, space specific germination count homogeneity, space specific germination size homogeneity, and space specific germination shape homogeneity. Color based spatial aggregate metrics include space specific canopy histogram homogeneity, space specific canopy K-means color cluster size homogeneity, and space specific flower color histogram homogeneity.

The space specific growth homogeneity is a metric of the variation in unit growth rates within the space, which is a measure of the overall level of amount of variability. The space specific flower count homogeneity is a metric of the variation of flower, or fruit, count of units within the space, which is a measure of the level of variability of a number of flowers, or fruits. The space specific flower count homogeneity may be subdivided into classes of flowers, or fruits, of distinct states. The space specific flower size homogeneity is a metric of the variation in flower, or fruit, sizes of units within the space, which is a measure of the baseline variability of flower, or fruit sizes. The space specific flower size homogeneity may be subdivided into classes of flowers, or fruits, of distinct states. The space specific flower cluster homogeneity is a metric of the variation in flower, or fruit, clustering of units within the space, which is a measure of the overall level of variability of flower, or fruit clustering. The space specific flower cluster homogeneity may be subdivided into classes of flowers, or fruits, of distinct states. The space specific germination count homogeneity is a metric of the variation in per unit germination count within the space, which is a measure of the baseline variability in germination rate. The space specific germination size homogeneity is a metric of the variation in per unit young plant size within the space, which is a measure of the baseline variability in young plant size. The space specific germination shape homogeneity is a metric of the variation in per unit young plant shape within the space, which is a measure of the baseline variability of young plant shape.

The space specific canopy histogram homogeneity is a metric of the variation in color distribution of units within the space, which is a measure of the level of color variability. The space specific canopy K-means color cluster size homogeneity is a metric of the variation in the color band distribution of units within the space, which is a measure of the color variability. The space specific flower color histogram homogeneity is a metric of the variation in color distribution of flowers, or fruits, of units within the space, which is a measure of the level of flower, or fruit, color variability. The space specific flower color histogram homogeneity may be subdivided into classes of flowers, or fruits, of distinct states.

The images depicting plants 110 in the individual units 108(1)-108(6) may be uploaded to the image processing services at the image processing server. Processed images are then uploaded to the disease detection services at the disease detection server to measure one or more growth based or color based metrics. In the illustrated embodiment, the plants 110 in unit 108(5) may be affected by a plant disease. In response to detecting, via the disease detection services, at least one difference in the metrics of the plants 110 in unit 108(5), the image capture device 106 may be instructed to capture and upload additional images of the unit 108(5) to the image processing server and the additional images that are processed may then be uploaded to the disease detection server. In various embodiments, the individual metrics may be weighted based at least on the type of plant. For example, flowers are generally not a feature of leafy greens. Thus, only the metrics related to canopy coverage and canopy histogram may be utilized.

Figure 3:
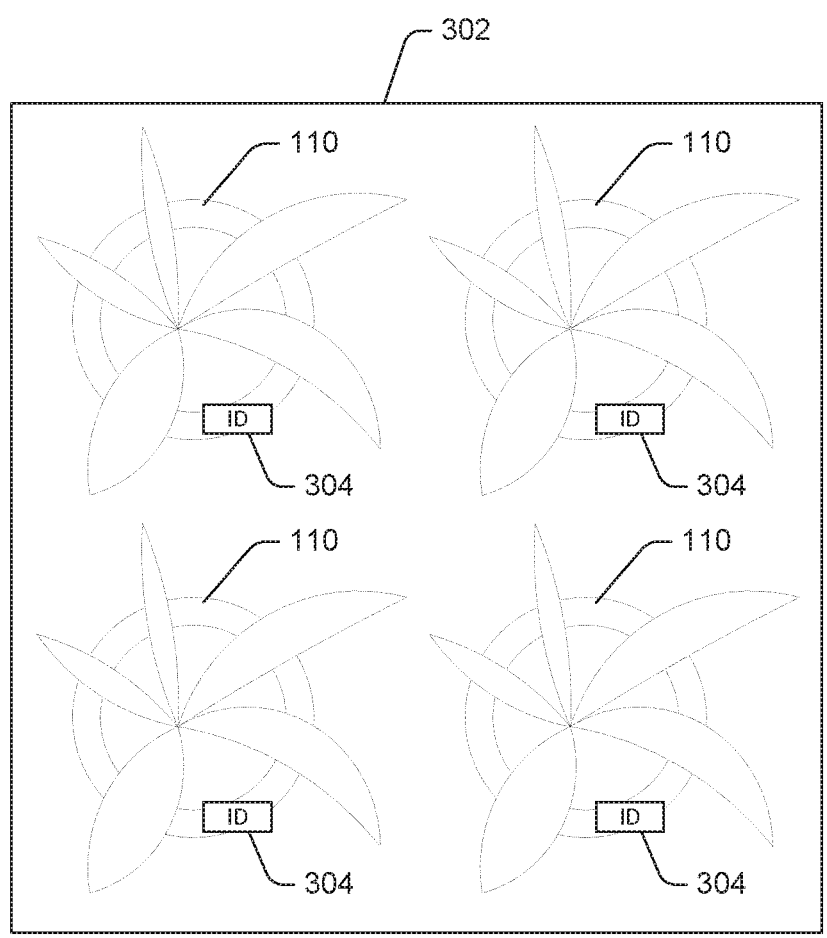
FIG. 3 illustrates an example image captured by an image capture device for use in disease detection.

FIG. 3 illustrates an example image 302 captured by an image capture device for use in disease detection. The image capture device is configured to capture one or more images of plants or groupings of plants included in a grow operation. In one example, each image 302 includes a single plant 110. In other examples, each image 302 may include more than one plant 110. In various embodiments, however, each image 302 can depict a target, or an item of interest such as a person, a machine, an object, and the like.

As mentioned above, the processing of the images by image analysis services, image processing server, and/or image processing pipeline may include classifying the plant as a certain plant type, and/or identifying the plant as the same plant that was previously identified. In some implementations, each plant included in the grow operation may be affixed with an identifier 304. Thus, an image 302 can depict one or more identifiers 304 that are affixed to the plants. The identifier 304 may include one or more visual matrix codes, such as QR codes, Aztec Codes, Maxi Codes, or other visually-readable identifiers such as a barcode that provides the type of plant and/or a unique identifier of this particular plant. In some examples, the visual matrix codes may be analyzed after the image 302 has been uploaded to the image processing server. In other examples, the image capture device may include a reader (e.g., barcode reader and/or QR code reader) to read the identifier 304. Thus, in this example, the image capture device may be configured to append the plant identification into metadata associated with each image 302. In yet other examples, the identifier 304 may include a radio-frequency identification (RFID) and/or near-field communication (NFC) tag. Thus, the image capture device may include an RFID reader and/or NFC reader to detect the identifier 304 and append corresponding plant identification data into the captured image.

The image 302 may represent one image obtained by an image capture device. In some implementations, hundreds, if not thousands of images may be obtained and uploaded to the image processing server. Thus, in some examples, the image processing server may be configured to perform image selection to reduce the number of images stored. For example, after processing a number of images received from a certain grow operation, the image processing server may determine that nothing abnormal appears in any of the images (i.e., no issues, no anomalies, etc.). Thus, rather than storing all images received from the grow operation, the image processing server may store a subset (one or more) of the images received as representative of all images obtained from that grow operation.

Example Computing Device Components

Figure 4:
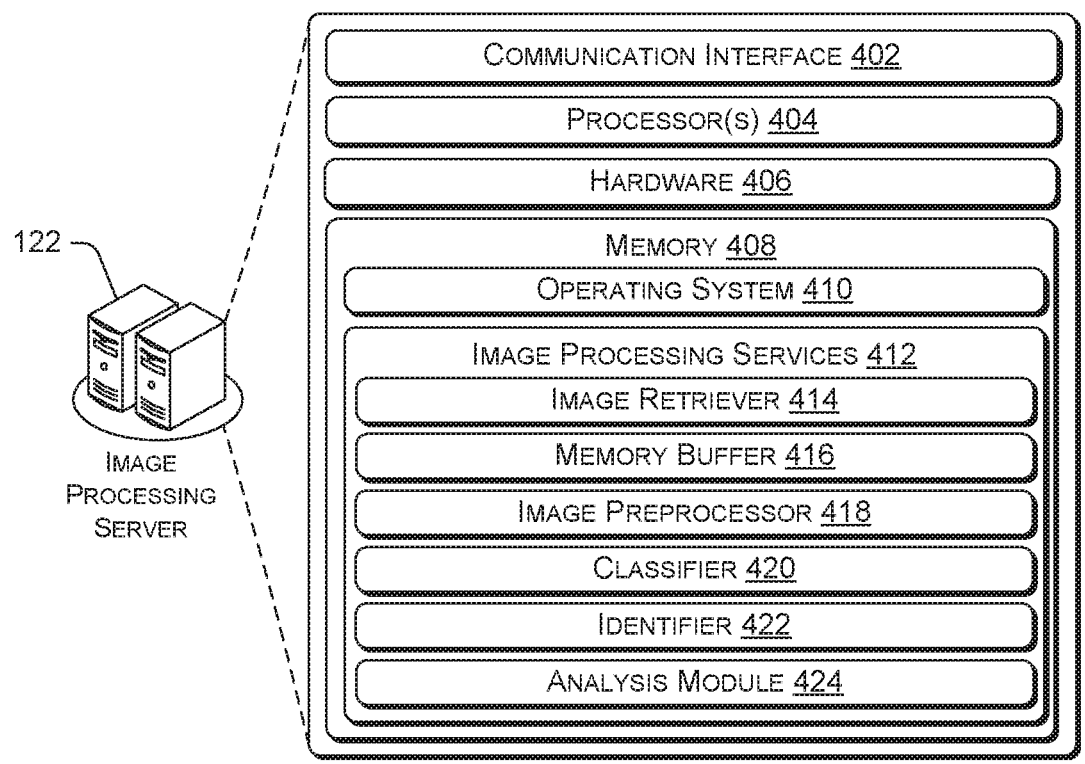
FIG. 4 is a block diagram of exemplary computing devices for performing image processing services.

FIG. 4 is a block diagram showing various components of the illustrative image processing server 122 for providing processed image using image processing techniques. It is noted that the image processing server 122 as described herein can operate with more or fewer of the components shown herein. Additionally, the image processing server 122 as shown herein or portions thereof can serve as a representation of one or more of the computing devices of the present system.

The image processing server 122 may include a communication interface 402, one or more processors 404, hardware 406, and memory 408. The communication interface 402 may include wireless and/or wired communication components that enable the image processing server 122 to transmit data to and receive data from other networked devices. In at least one example, the one or more processor(s) 404 may be a central processing unit(s) (CPU), graphics processing unit(s) (GPU), both a CPU and GPU or any other sort of processing unit(s). Each of the one or more processor(s) 404 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution.

The one or more processor(s) 404 may also be responsible for executing all computer applications stored in the memory, which can be associated with common types of volatile (RAM) and/or non-volatile (ROM) memory. The hardware 406 may include additional user interface, data communication, or data storage hardware. For example, the user interfaces may include a data output device (e.g., visual display, audio speakers), and one or more data input devices. The data input devices may include but are not limited to, combinations of one or more of keypads, keyboards, mouse devices, touch screens that accept gestures, microphones, voice or speech recognition devices, and any other suitable devices. Additionally, the data input devices may include an image capture function.

The memory 408 may be implemented using computer-readable media, such as computer storage media. Computer-readable media includes, at least, two types of computer-readable media, namely computer storage media and communications media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. The memory 408 may also include a firewall.

The processors 404 and the memory 408 of the image processing server 122 may implement an operating system 410. The operating system 410 may include components that enable the image processing server 122 to receive and transmit data via various interfaces (e.g., user controls, a communication interface, and/or memory input/output devices), as well as process data using the processors 404 to generate output. The operating system 410 may include a presentation component that presents the output (e.g., display the data on an electronic display, store the data in memory, transmit the data to another electronic device, etc.). Additionally, the operating system 410 may include other components that perform various additional functions generally associated with an operating system. The processors 404 and the memory 408 of the image processing server 122 may also implement the communication services 402.

In the illustrated embodiment, the image processing services 412 may include an image retriever 414, a memory buffer 416, an image preprocessor 418, a classifier 420, an identifier 422, and an analysis module 424. The image processing services 412 may include routines, program instructions, objects, and/or data structures that perform particular tasks or implement particular abstract data types. For example, the image retriever 414 may include one or more instructions, which when executed by one or more processors, acquire captured images from the image capture devices, the horticultural management device, the intermediate servers, and/or other data sources of the grow operation.

The image retriever 414 manages the receiving of images from image capture functions. The throughput of images and supplementary data may differ. Accordingly, the image retriever 414, may manage the timing, speed, and a party (e.g., image dispatcher service, computing devices, image capture functions, image capture devices, etc.) controlling the data transfer. For example, the image retriever 414 may act as a simple data store, which receives and stores images upon receipt as pushed by an image capture function. Alternatively, the image retriever 414 may affirmatively pull images for image capture functions.

One example of a pull scenario is where one or more computing devices are first joining the network. The image capture function may be implemented in another computing device or a luminaire feedback device. When this happens, one or more image capture functions could potentially overload the computing devices by sending a large number of images. To prevent overload, the image retriever 414 may negotiate a controlled transfer with the one or more image capture functions.

The image retriever 414 may place one or more images in the memory buffer 416 where additional image processing services (e.g., image preprocessing, classification, analysis, etc.) may be applied. The memory buffer 416 is dedicated memory, generally part of the memory unit of the image processing server 122, where a retrieved image may reside to be processed. Common memory buffers 416 are contiguous dedicated RAM, where the data comprising an image may be accessed directly rather than via a series of central processing unit commands. Generally, such a configuration is via a GPU.

The image preprocessor 418 may include one or more instructions, which when executed by one or more processors, perform transformations to an image to enable analysis.

Example operations to enable analysis are to decompress and/or decrypt incoming images via the respective decompression and/or decryption algorithms. Example operations to increase the likelihood of successful analysis in order to apply one or more transformations and/or content analysis algorithms are Gaussian Blur, Image Segmentation, and Red-Green-Blue (RGB) content analysis. Where possible, algorithms may attempt to take partial images, corrupt images, or otherwise substandard images and apply corrections sufficient to support analysis. However, the image preprocessor 418 may also contain logic to remove images with insufficient information or low-quality images from the workflow. In this way, data collected during the subsequent analysis will not contain data from corrupt or misleading images. This cleaning logic may be part of the image preprocessor 418 or alternatively may be in a separate image cleaning software component.

The classifier 420 may include one or more instructions, which when executed by one or more processors, identify which portions of an image representing a plant is to be analyzed as opposed to portions of the image representing items other than the plant to be analyzed. The classifier 420 identifies discrete objects within the received image and classifies those objects by size and image values, either separately or in combination. Example image values include inertia ratio, contour area of segmented plant object, and Red-Green-Blue components. Based on those values, the objects are ranked and sorted. Items above a predetermined threshold or the highest N objects are selected as portions of the received image representing the plant.

The identifier 422 may include one or more instructions, which when executed by one or more processors, identify the plant in the received image and to identify artifacts in the plant. The identifier 422 may compare the image data of the plant in the received image to that of other images that may be stored in a database (e.g., an image database or the data store). In order to perform those comparisons, the identifier 422 may create a plant state vector comprised of values and value sets generated by one or more algorithms of the identifier 422, such as constructed vector corresponds to the state of a plant in an image. The created plant state vector is compared against other plant state vectors to perform general comparisons as well as sequential analysis. In various embodiments, a series of state vectors may be used.

The identifier 422 contains several identification algorithms. Some algorithms work directly on a single image. Other algorithms may process a series of images classified together into a category, collect information in common, and apply to subsequent images. Example categories may be images of the same plant over time, images of the same genus and species of plant, images of plants given the same care, and images of plants located in the same grow operation.

In one example, the identifier 422 collects color histogram data over a plurality of images of the same category and generates an average histogram comprised of the averages or weighted averages of each distribution variable comprising the histogram. Accordingly, when an image is received belonging to the same category, the identifier 422 may use the average histogram to identify the plant and artifacts in the plant. The average histogram is then recalculated using the histogram of the incoming image. In this way, the average histogram becomes an adaptive histogram with improving performance. In some embodiments, the logic to perform analysis using data from a plurality of images, or performing computationally intense logic, may be separated from the identifier 138 into another software component such as an edge cleaner software component.

The analysis module 424 may include one or more instructions, which when executed by one or more processors, take the transformed image, and potentially any generated additional information, such as a plant state vector, and maps portions of the image to indicia corresponding to a feature of a plant. This indicia is called an artifact. Because the classifier 420 identified objects comprising portions (e.g., plant branches, leaf structure, root structure, fruit, flowers, etc.) of a plant, those portions may be subjected to analysis of visual information, and the identifier 422 may have generated information about those portions, image analysis may provide information related to artifacts indicating issues in the plant.

The image processing server 122 may have access to a data store. The image processing server 122 may store raw images, transformed images, generated plant state vectors, and other related information for archival and/or reporting after processing is complete. The data store may be configured as a relational database, an object-oriented database, a NoSQL database, and/or a columnar database, or any configuration to support scalable persistence. Reporting may be performed by a querying software component (not shown). Because each image is associated with a plant, date/time stamp, plant state vector, and potentially identified issues, images may be queried by any or all of these data values.

Figure 5:
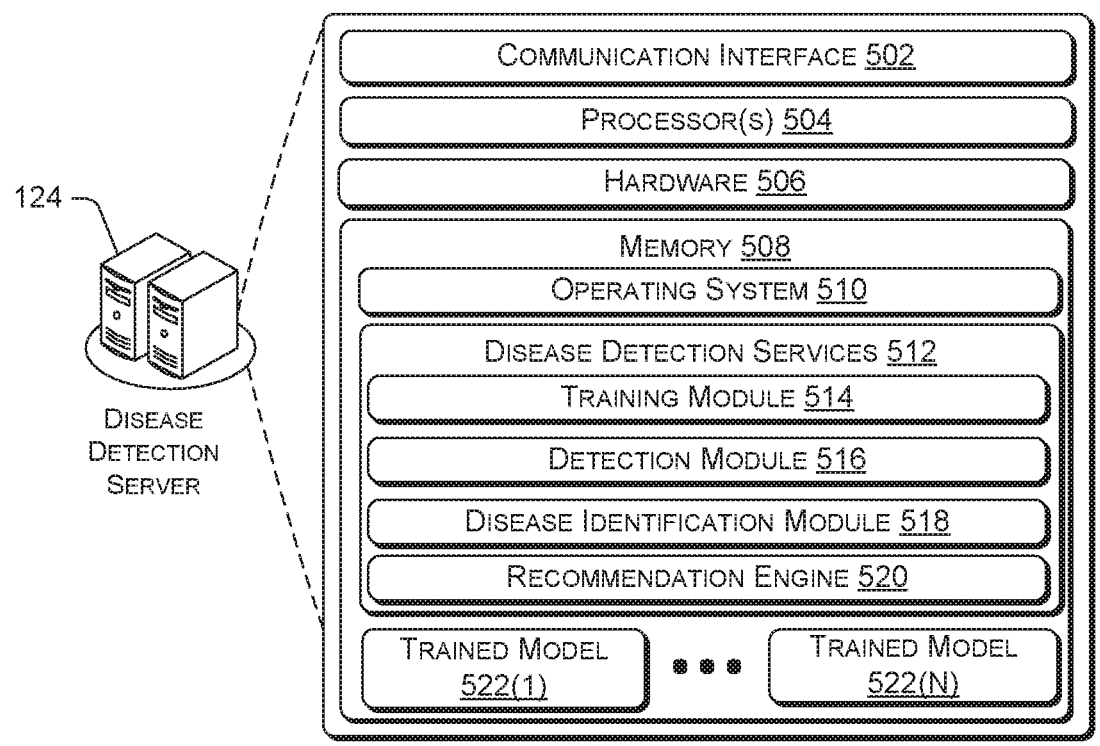
FIG. 5 is a block diagram of exemplary computing devices for performing disease detection using image processing techniques.

FIG. 5 is a block diagram showing various components of illustrative disease detection server 124 for performing disease detection using image processing techniques. It is noted that the disease detection server 124 as described herein can operate with more or fewer of the components shown herein. Additionally, the disease detection server 124 as shown herein or portions thereof can serve as a representation of one or more of the computing devices of the present system.

The disease detection server 124 may include a communication interface 502 one or more processors 504, hardware 506, and memory 508. The communication interface 502 may include wireless and/or wired communication components that enable the disease detection server 124 to transmit data to and receive data from other networked devices. In at least one example, the one or more processor(s) 504 may be a central processing unit(s) (CPU), graphics processing unit(s) (GPU), both a CPU and GPU or any other sort of processing unit(s). Each of the one or more processor(s) 504 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution.

The one or more processor(s) 504 may also be responsible for executing all computer applications stored in the memory, which can be associated with common types of volatile (RAM) and/or non-volatile (ROM) memory. The hardware 506 may include additional user interface, data communication, or data storage hardware. For example, the user interfaces may include a data output device (e.g., visual display, audio speakers), and one or more data input devices. The data input devices may include but are not limited to, combinations of one or more of keypads, keyboards, mouse devices, touch screens that accept gestures, microphones, voice or speech recognition devices, and any other suitable devices.

The memory 508 may be implemented using computer-readable media, such as computer storage media. Computer-readable media includes, at least, two types of computer-readable media, namely computer storage media and communications media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. The memory 508 may also include a firewall.

The processors 504 and the memory 508 of disease detection server 124 may implement an operating system 510. The operating system 510 may include components that enable the disease detection server 124 to receive and transmit data via various interfaces (e.g., user controls, a communication interface, and/or memory input/output devices), as well as process data using the processors 504 to generate output. The operating system 510 may include a presentation component that presents the output (e.g., display the data on an electronic display, store the data in memory, transmit the data to another electronic device, etc.). Additionally, the operating system 510 may include other components that perform various additional functions generally associated with an operating system. The processors 504 and the memory 508 of the disease detection server 124 may also implement the disease detection services 512.

In the illustrated embodiment, the disease detection services 512 may include a training module 514, detection module 516, disease identification module 518, a recommendation engine 520, and one or more trained models 522(1)-522(N). The disease detection services 512 may include routines, program instructions, objects, and/or data structures that perform particular tasks or implement particular abstract data types. For example, the training module 514 may include one or more instructions, which when executed by one or more processors, train the geolocation models 522(1)-522(N) for use with various machine learning algorithms that perform data analysis, such as supervised learning, unsupervised learning, semi-supervised learning, naïve Bayes, Bayesian networks, decision trees, neural networks, fuzzy logic, and/or probabilistic classification algorithms.

The detection module 516 may implement the machine learning algorithms that use the trained models 522(1)-522(N) to determine a presence of a plant disease based on the input data that are associated with an image depicting plants. For example, the detection module 516 may receive data input such as measurements for growth based or color based unit metrics or spatial aggregate metrics. The metrics are associated with a weight that can be initially set manually based on horticultural theory and practice. The weights may be adjusted over time via supervised learning initially and then subsequently via unsupervised learning. In turn, the detection module 516 may process the data inputs using the trained models 522(1)-522(N) to calculate the probability that the image depicts a plant that is affected by a plant disease.

Following the calculation of the probabilities, the detection module 516 may trigger the disease identification module 518 to identify the plant disease that may be affecting the plant depicted in the image. In some embodiments, the disease identification module 518 may identify a plant disease based on one or more characteristic patterns depicted in a growth curve using historical data relating to growth rates. In alternative embodiments, the disease identification module 518 may perform a coarse identification of a plant disease based on one or more images. In this regard, the images may depict physical attributions of a plant that is characteristic of specific plant diseases.

The training module 514 may train machine learning models such as the trained models 522(1)-522(N) to identify plant diseases. The training module 514 may use a machine learning training pipeline to generate the trained models 522(1)-522(N). The machine learning training pipeline can include a training data input phase, a feature engineering phase, and a model generation phase. During the data input phase, the training module 514 receives a training corpus including input datasets or training data that emulates data collected from the image processing server and optionally a set of desired outputs for the training data. For example, the data that is received during the training data input phase can include growth based or color based unit metrics or spatial aggregate metrics.

The feature engineering ascertains the properties and relationships of the training corpus to distinguish between the data classes. Thus, feature engineering may be used by the training module 514 to figure out the significant properties and relationships of the input datasets that aid a model to distinguish between different classes of data. the training module 514 may perform outlier detection analysis, feature composition analysis, and feature relevance analysis during the feature engineering phase. In the outlier detection analysis, the training module 514 may detect outlier features or exclusion from use in the generation of a machine learning model. In various embodiments, the outlier detection analysis may be performed using a clustering algorithm, such as a K-means algorithm, a Gaussian mixture algorithm, a bisecting K-means algorithm, a streaming K-means algorithm, and/or another outlier detection algorithm.

In the feature composition analysis, the training module 514 may transform at least some of the multiple features in the training corpus into a single feature. Accordingly, feature composition may be decreased the number of input features while preserving the characteristics of the features. This decrease in the number of features may reduce the noise in the training corpus. As a result, the composition feature that is derived from the multiple features may improve the classification results for the datasets of the training corpus. In various embodiments, the feature composition analysis may be performed using various dimensionality reduction algorithm, such as a Singular Value Decomposition (SVD) algorithm, a Principal Component Analysis (PCA) algorithm, and/or another type of dimensionality reduction algorithm. Further, the trained models 522(1)-522(N) may incorporate a combination of multiple machine learning algorithms, such as a Bayesian algorithm, a decision tree algorithm, a Support Vector Machine (SVM) algorithm, backpropagation neural networks, evolutionary neural networks with fitness or novelty based objective functions, single or multivariate logistic regression, or any combination thereof, to increase the accuracy of the identification of plant diseases generated by the model. Machine learning models may be combined (i.e., ensemble learning), and vote on the correct classification with a majority rules schema, increasing the robustness of the prediction.

In the feature relevance analysis, the training module 514 may identify redundant features in the training corpus to eliminate such features from being used in the training of the machine learning model. An excessive number of features may cause a machine learning algorithm to over-fit a training corpus or slow down the training process. In various implementations, the feature relevance analysis may be performed using a dimensionality reduction algorithm (e.g., the PCA algorithm, a statistics algorithm, and/or so forth). The statistics algorithm may be a summary statistics algorithm, a correlation algorithm, a stratified sampling algorithm, and/or so forth.

The training module 514 may perform the model generation phase following the completion of the feature engineering phase. During the model generation phase, the training module 514 may select an initial type of machine learning algorithm to train a machine learning model using a training corpus. Following the application of a selected machine learning algorithm to the training corpus, the training module 514 may determine a training error to determine the accuracy of the machine learning model. If the measurement for the training error is above a predetermined threshold, another machine learning algorithm may be selected.

Upon identifying the plant disease, the recommendation module 520 may recommend at least one course of action to mitigate the identified plant disease. The recommendation module 520 may access a database, which may be searched for the identified disease and/or remediation course of action. In various embodiments, the database may comprise a solutions table from which a remediation course of action may be selected based at least on the identified disease. The remediation course of action may also be selected based at least on one or more environmental factors (e.g., temperature, lighting conditions, etc.) and/or other sensor data collected via one or more sensors (e.g., total dissolved solids (TDS) sensor, pH sensor, and/or soil moisture sensor, etc.) in a grow operation, wherein the sensors may be in communication with the disease detection services 512. Additionally, the recommendation module 520 may receive feedback from the one or more sensors and/or the horticultural management device in order to determine whether or not the implemented solution was successful. If the feedback indicates that the implemented solution was unsuccessful, another course of action for remediation may be selected. In this regard, the remedial actions may be sorted in a predetermined order. For example, the remedial actions may be sorted in the order of likelihood of success. In another example, the remedial actions may be sorted in the order of least invasive to most invasive, least costly to most costly, least labor intensive to most labor intensive, and/or so forth. Upon identifying at least one course of action for remediation, the disease detection services may interact directly with the horticultural management device or other components or devices used in the grow operation via the intermediate servers, and/or other interfaces to the grow operation.

Figure 6:
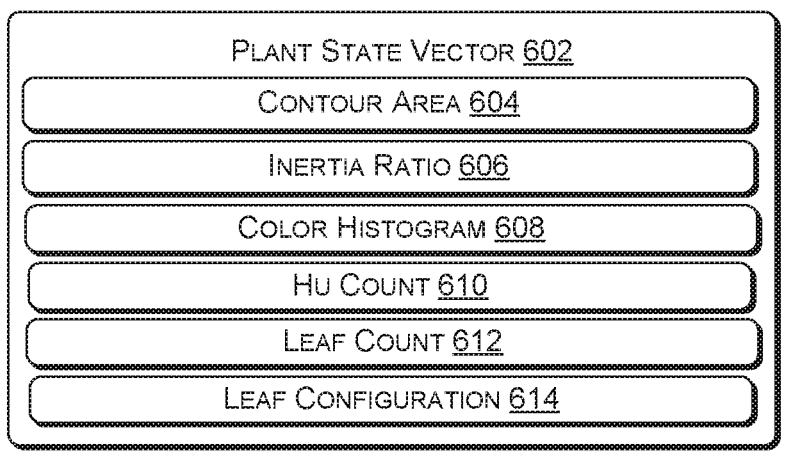
FIG. 6 is an exemplary plant state vector for performing disease detection using image processing techniques.

FIG. 6 shows a diagram of an exemplary plant state vector 602. The plant state vector 602 is a data representation that captures the state of a plant as interpreted from an image. During image preprocessing, classification, and identification, image information is extracted via various image operations. The image information not only can be persisted in a plant state vector such that the information need not be recalculated, but also that information can act as a proxy for the plant during comparison operations. By comparing at least a portion of the plant state vector, the image analysis service may determine whether plants represented in different images should be analyzed together. The plant state vector 602 comprises the contour area 604, inertia ratio 606, color histogram 608, Hu count 610 leaf count 612, and leaf configuration 614 as calculated during preprocessing, classification, and identification.

The contour area 604 is a value from performing contour tracing, a technique used in feature recognition. Specifically, a tessellation is overlaid over an image, and a threshold color difference, and/or a border pixel width, are specified to be interpreted as the border between features in an image. The contour area 604 is performed during classification when the image is analyzed to identify plant and non-plant features, as well as during identification, where artifacts of the plant are identified. Upon performing a contour trace, the contour area is the area of the image known to represent the plant.

The inertia ratio 606 is a value from performing shape factor analysis, a technique used in determining how much a shape in an image deviates from an expected shape. For example, a portion of a plant may be identified as an artifact. When the artifact deviates from an expected shape, the deviation may be an indication of an issue with the plant. The inertia ratio 606 is a value calculated to indicate the degree of deviation. Specifically, it provides a measure of the long-ness of a shape with respect to the degree of symmetry. For example, it can indicate how oval, a circular shape is.

A color histogram 608 is a pixel count organized into a histogram, where the histograms variables represent different colors. The colors may simply be red-green-blue or may be of a greater spectrum of colors. In one embodiment, the contour area 604, inertia ratio 606, and the color histogram 608 may be used to determine the likeliness that a portion of an image is to be considered representing a plant. For example, the following calculation may be used to rank image portions as likely representing a plant:

$$\text{Rank Value} = (\text{contour area} \times \text{inertia ratio}) \times [\text{green}/(\text{red}+\text{blue})]$$

For the plant state vector, the contour area 604, inertia ratio 606, and the color histogram 608 may be stored on a per image portion basis, or alternatively may be aggregated into a single contour area, inertia ratio, and color histogram for all the portions of the image deemed to represent a plant.

The Hu count 610 is a count of Hu moments which are a form of image moments in image processing. An image moment is a measure of pixel intensity. In the alternative, the actual moment calculations, rather than just the count, may be stored and image moment calculations need not be Hu moments.

The leaf count 612 is a value of the count of leaves (or needles) in the portions of an image deemed to be a plant. The leaf configuration 614 is a representation of the position and orientation of the leaves (or needles) in space. Image analysis can identify the configuration of an arbitrary branch structure. Accordingly, a plant state vector may alternatively include vein structure of leaves, branches of the plant, and the root structure of a plant. In general, branching for leaves, needles, branches, and roots may be stored as a tree structure where edges store lengths and nodes store the identity and orientation of edges corresponding to branches in space.

In one example, image A and image B may have similar metadata pertaining to a plant from the same greenhouse. In this case, a query may be applied to an image database and both images may be retrieved, and the plants in image A and image B may be understood to be similarly situated so that they should be analyzed together. In this regard, the plants in image A and image B may be expected to have similar degrees of health because they are similarly situated.

The plant state vector 602 either alone, or in conjunction with image metadata, can be used to find comparable plants to a finer degree of resolution. If the plant state vector 602 includes a branch analysis of a plant in an image or includes a color histogram of the portions of the image relating to a plant, similarly situated plants can be retrieved in a query, even if they are located in different greenhouses or grown in different times. In this way, a plant suffering from rot in a first greenhouse may be retrieved along with another suffering from rot in a second greenhouse, grown at a different time. As with the previous example, a grower may take action to determine if there were similar causes. In some cases, data related to the plant state vector 602 can be stored in a database, which may also contain suggestions for causes of an identified issue. Thus, analysis by the grower may be aided by the database or automated.

There are many potential values that may be used for the plant state vector 602. Generally, the values chosen are to be mathematically transformational and translational invariant. Exemplary types of mathematical transformations are scaling, skewing rotation, reflection over a point and reflection over an axis. Additionally, a mathematical translation may consider a movement of an object in a particular direction through space. Specifically, even if a plant is moved, or rotated in the time between different images, the plant should be identifiable as the same plant.

Example Processes

FIGS. 7 through 12 present illustrative processes 700-1200 for providing object recognition horticultural based feedback analysis. The processes 700-1200 are illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 700-1200 is described with reference to FIGS. 1 through 6.

Figure 7:
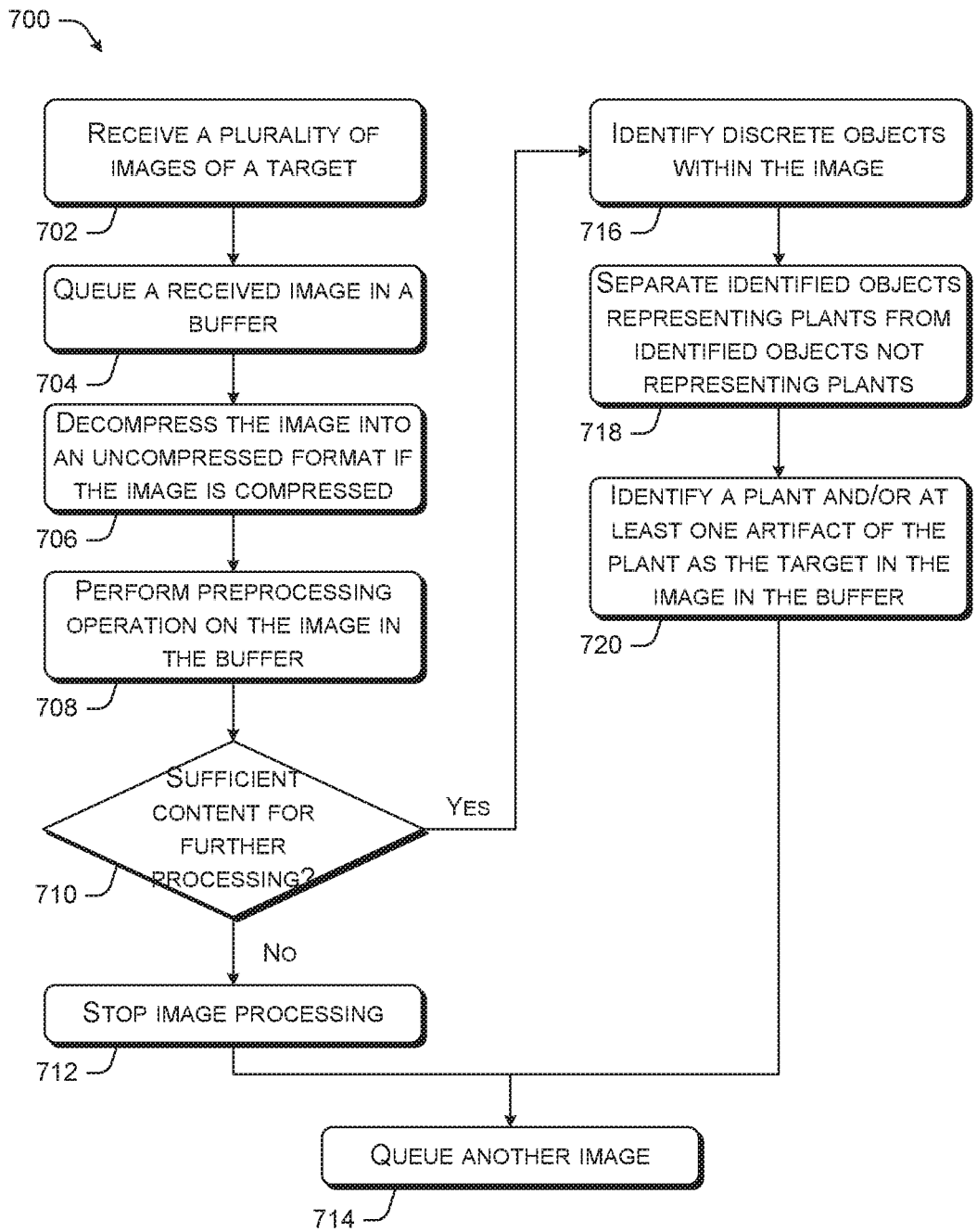
FIG. 7 is a generalized workflow for providing object recognition analysis.

FIG. 7 is a flow chart 700 of the generalized workflow for providing object recognition analysis. At block 702, an image retriever receives one or more images depicting a target (e.g., plants) from an image capture device. Because of the relatively large amount of bandwidth used by image and/or video data, the image retriever may perform a negotiated bandwidth transfer of images. For instance, the image retriever may query an image capture function for the size of its image memory cache. In response, the image retriever may calculate the sum total image memory cache of all image capture functions attempting to upload images. The image retriever may then automatically schedule uploads based on available bandwidth. Additionally, or alternatively, the image retriever may prioritize uploads or schedule uploads based at least on user input. In this way, image transfer may be performed during times with otherwise minimal network traffic and not interfere with another network use.

At block 704, the image retriever stores at least one image for processing in a memory buffer. Once buffered, the image is preprocessed. At block 706, the image preprocessor can decompress and/or decrypt the buffered image into its native format. In some cases, the native format of the buffered image may not be usable by preprocessing algorithms, identifier algorithms, and/or other algorithms. In this case, the image preprocessor may convert the buffered image from its native format to the applicable file format or a predetermined file format (e.g., Joint Photographic Experts Group (JPEG), Tagged Image File Format (TIFF), Graphics Interchange Format (GIF), Windows bitmap (BMP), Portable Network Graphics (PNG), etc.).

At block 708, the image preprocessor may apply one or more preprocessing algorithms. Preprocessing algorithms may be directed to filtering and/or enhancing, which increases contrast, pixel intensity, and other attributes to optimize image recognition. Preprocessing algorithms may also be directed to eliminating noise. In general, preprocessing algorithms are directed to an image processing operation that will aid subsequent classification and identification image processing. Exemplary image processing algorithms may include the pre-calculation and generation of a red-green-blue histogram or other histograms with pixel color counts as a variable. Additionally, or alternatively, the histogram may be a hue-luminance-saturation histogram of colors. The generated color histogram may be stored in a plant state vector. In some cases, the color histogram pre-calculation may be used with an adaptive histogram aggregating information from a plurality of images.

Other exemplary image processing algorithms may include a count of mathematical morphological operations. Mathematical morphology is an application of mathematics to image processing to determine the shape and spatial attributes such as size, convexity, connectivity, and geodesic distance. These attributes may be manipulated using morphological operations such as erosion, dilation, opening, and closing. For example, an algorithm may count the number of morphological opens and closes to help determine sub-shapes in an image. Other exemplary image processing algorithms may apply a transform to the image to make the image clearer or otherwise easier to discern features during classification and identification. One example algorithm applies a Gaussian function on a per pixel basis in an image. In this way, pixels with high contrast with respect to neighboring pixels are attenuated to lower contrast base on the Gaussian function.

Other exemplary image processing algorithms may apply filters to the image which, while removing information, increase contrast to better discern features during classification and identification. One example algorithm is Otsu segmentation. Specifically, Otsu segmentation is the setting of one or more filters using a color attribute such as hue, luminance or saturation, or alternatively red-green-blue value, to segment an image into zones, each zone having its own color in high contrast with respect to neighboring segments. Otsu segmentation generally transforms an image into grayscale zones. The resulting image may then be used as a filter or stencil with respect to the original image.

At decision block 710, the image preprocessor may determine whether the buffered image comprises sufficient information for an ORB-HFA application. For example, the image preprocessor may determine that the memory buffer does not comprise sufficient information for analysis if the memory buffer comprises a partial file or a corrupt file. In various embodiments, corrupted files may be preprocessed by applying pre-processing algorithms to repair the files. If a buffered image does not comprise sufficient information ("no" response from the decision block 710), the buffered image is discarded as indicated in block 712. Similarly, in some cases, preprocessing may result in a buffered image that comprises insufficient information. For example, the generated color histogram indicates that the image is mostly dark, suggesting an obstructed camera. By way of another example, during Otsu segmentation, it may appear that the image does not contain enough segments indicating an image where sub-shapes could not be determined. To avoid the introduction of erroneous or corrupted images into classification and identification, the image preprocessor may discard images as indicated in block 712.

If a buffered image comprises sufficient information ("yes" response from the decision block 710), the buffered image is classified. Classification is the identifying of plant versus non-plant portions of the image. At block 716, the classifier identifies discrete objects within the buffered image. The image preprocessor algorithms may generate a list of objects in the image by applying a segmentation algorithm such as Otsu segmentation. Accordingly, different portions of the image may be identified as discrete objects or contiguous sets of pixels corresponding to an item whose image was captured in the buffered image. If segmentation is not completed by the image preprocessor, then the classifier may generate the discrete object list.

At block 718, the classifier may classify the discrete objects into plant and non-plant objects. Upon obtaining a discrete object list for the buffered image, the objects may be sorted by size, from the largest to the smallest. A predetermined threshold may be specified for the maximum size and the minimum size. In this way, only the image objects of a certain size within the predetermined threshold may be processed to reduce the processing load.

A rank value is calculated for the N largest objects. The rank value generally relates to an indication that a discrete object's shape and color corresponds to an expected plant feature. After calculation of the rank values, the top X values, X being a predetermined threshold, will be deemed to be representing a plant in the image. In this way, only discrete objects deemed to represent the plant are differentiated from discrete objects deemed not to represent the plant in the buffered image.

After classification, the portions of the buffered image deemed to represent a target, or an item of interest in the image is processed by the identifier software component and identifier algorithms to identify the identity of the target in the image. While the target may be any item captured in the image, a person, a machine, and the like, generally the target will be a plant. The degree of identification may simply be to identify the genus and species of the plant in the buffered image. However, this information may also be in metadata already. The identification may also be of a particular plant e.g. the ninth red rose shrub out of a lot of twelve. Because information is stored on a per plant basis, some identification algorithms may determine that an object is the same plant as in another image, but just moved or rotated.

At block 720, artifacts comprising the plant in the buffered image are identified by the identifier. More specifically, the identifier may apply one or several algorithms to segment the portions of the buffered image deemed to represent a plant as opposed to the entire buffered image. The portions may then be segmented, for example using Otsu segmentation. Where segments and attributes of the segments such as morphological attributes and color match a plant, positive identification of the plant may be achieved.

Because the plant may comprise a plurality of discrete objects, not only can the plant be identified, but discrete objects comprising the plant may also be identified. These discrete objects, such as petals and leaves, comprise artifacts of the plant. Prior to segmentation, the identifier software component may apply additional preprocessing specific to the discrete objects deemed to represent a plant. Some of this preprocessing makes use of adaptive and iterative techniques. Upon processing the image to identify a plant and/or the plant's artifacts, processing may continue by queuing another image as indicated in block 714.

Notwithstanding FIG. 7, image processing is not necessarily linear. In some cases, image processing may involve the aggregation, or the statistical combining of information from multiple images to create a baseline or basis to compare images and artifacts in images. Such a creation of a baseline, where the baseline may change as new images are processed is called adaptive processing.

Figure 8:
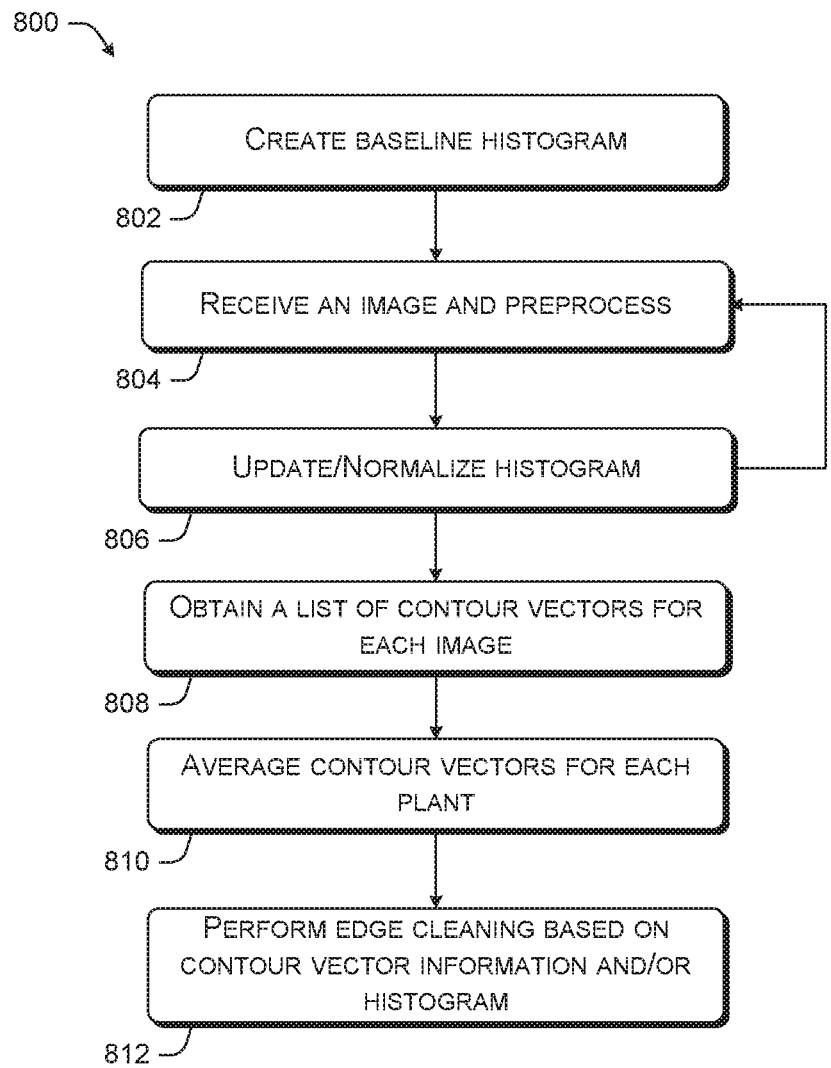
FIG. 8 is an exemplary flow chart of adaptive processing for identifying artifacts of plants in an image.

FIG. 8 is a flow chart 800 of an example of adaptive processing. Specifically, a color histogram is generated that captures statistically aggregated information over multiple images, and the adapting histogram is used during identification to refine artifacts of plants in an image. This process may be referred to as edge cleaning. Edge cleaning may be performed by the identifier software component or may be performed by a separate software component.

At block 802, a baseline histogram is initialized. The variables of the histogram may be set to zero or a prior histogram may be used. The baseline histogram may be adapted by adding information from additional images during processing. At block 804, an image is retrieved, buffered, and preprocessed. During preprocessing, histogram information, such as red-green-blue histogram information and/or hue-luminance-saturation information is extracted from the buffered image.

At block 806, the extracted histogram information is incorporated into the baseline histogram. The extracted histogram information may be added to the baseline histogram on a per variable basis. Additionally, or alternatively, the added histogram information may be weighted. In this way, the baseline histogram adapts into a statistical aggregated of multiple images to conduct updates or normalization. The baseline histogram may be calculated over a large number of images. When the histogram is deemed to have a critical mass of information, individual images may be processed. The histogram can be continuously updated and/or normalized. At block 808, a list of contour vectors is created. At block 810, the contour vectors are averaged for each plant in the image.

At block 812, the contour information and/or the baseline histogram, after the baseline histogram is deemed to have sufficient information, is used to perform edge cleaning, or preprocessing steps to enhance artifacts of the plant in the buffered image. At this point, the buffered image is ready for identification by the identification software component. The identification software component may calculate the ranking value of artifacts.

After identification of a plant and artifact of the plant, the plant is analyzed. The analysis may be static, specific to a single image, or sequential, an analysis of multiple images over time. Many times, image information extracted or generated from an image is aggregated with other static analysis information from other images which subsequently are collectively subjected to sequential analysis.

Figure 9:
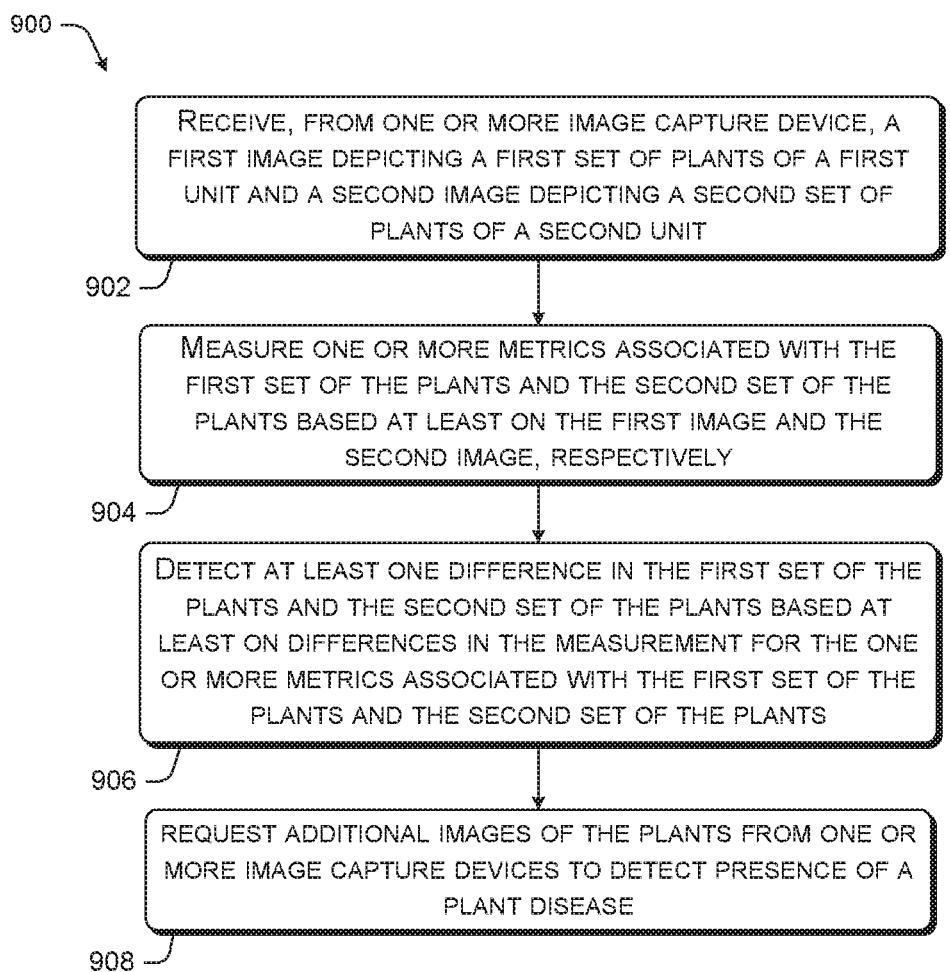
FIG. 9 is an overview flow chart of the detection stage of the disease detection services for detecting the presence of a disease.

FIG. 9 is an overview 900 of the detection stage. At block 902, the disease detection services may receive, from one or more image capture device, a first image depicting a first set of plants of a first unit and a second image depicting a second set of plants of a second unit. The second unit may be a neighboring unit of the first unit. For instance, the second unit may be contiguous or adjacent to the first unit. The first set of plants and the second set of plants may comprise plants of the same genus and species. At block 904, the disease detection services may measure one or more metrics associated with the first set of the plants and the second set of the plants based at least on the first image and the second image, respectively. In this regard, each unit metric that is measured for a plant is compared to its neighbors against a real time baseline or standard deviation among the neighboring plants in the space, or in similar neighboring spaces.

At block 906, the disease detection services may detect at least one difference in the first set of the plants and the second set of the plants based at least on differences in the measurement for the one or more metrics associated with the first set of the plants and the second set of the plants. At block 908, the disease detection services may request additional images of the plants from one or more image capture devices to detect the presence of plant disease. Once the detection stage is completed, the process may proceed to the classification stage.

Figure 10:
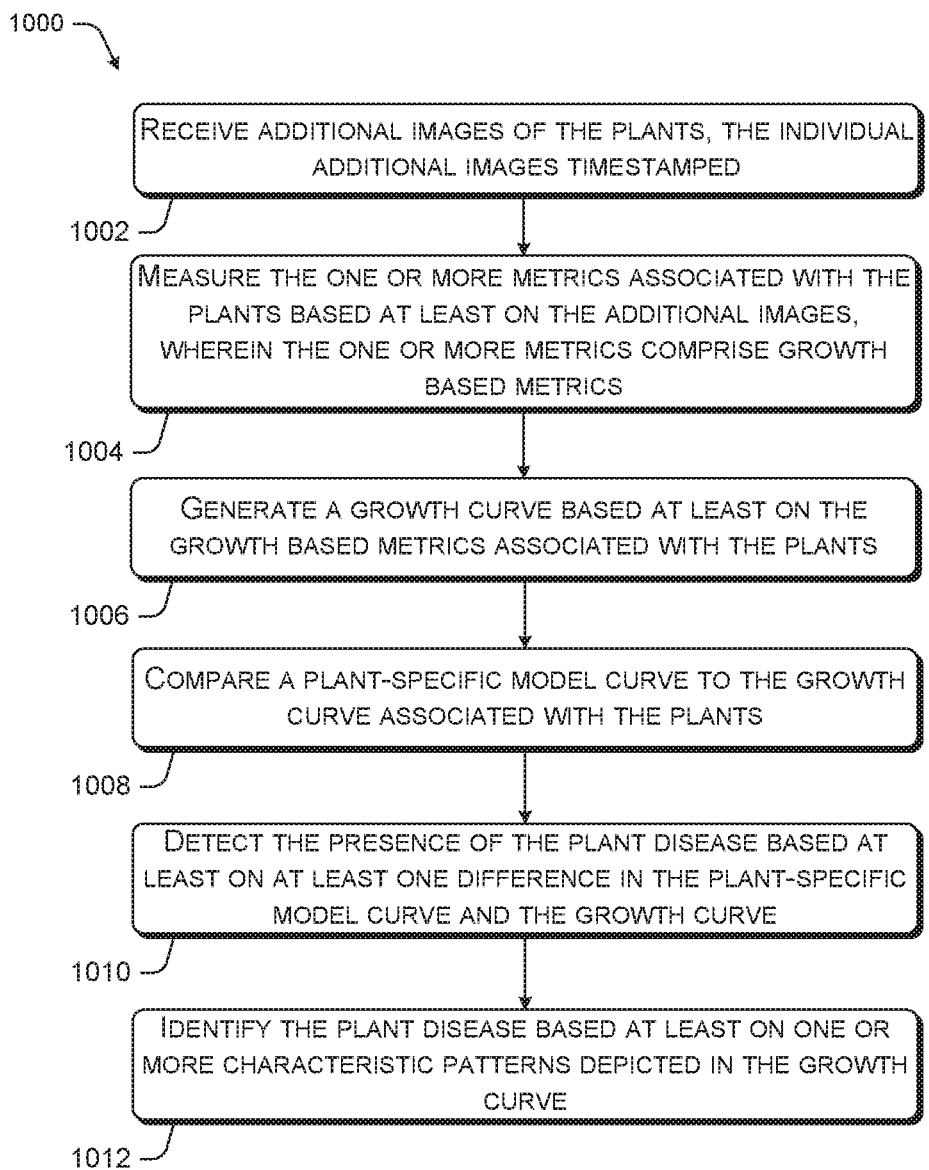
FIG. 10 is an overview flow chart of the classification stage of the disease detection services for identifying a disease that is present.

FIG. 10 is an overview of 1000 of the classification stage. At block 1002, the disease detection services may receive additional images of the plants, wherein the individual additional images are timestamped. At block 1004, the disease detection services may measure the one or more metrics associated with the plants based at least on the additional images, wherein the one or more metrics comprise growth based metrics. At block 1006, the disease detection services may generate a growth curve based at least on the growth based metrics associated with the plants. The growth based metrics are measured over time and therefore includes historical data relating to growth rates of the plants. At block 1008, the disease detection services may compare a plant-specific model curve, which is a known normal growth curve of a plant, to the growth curve, which is a known historical curve, associated with the plants. The normal growth curve of a plant can be retrieved from a database. At block 1010, the disease detection services may detect the presence of the plant disease based at least on at least one difference in the plant-specific model curve and the growth curve. At block 1012, the disease detection services may identify the plant disease based at least on one or more characteristic patterns depicted in the growth curve.

Figure 11:
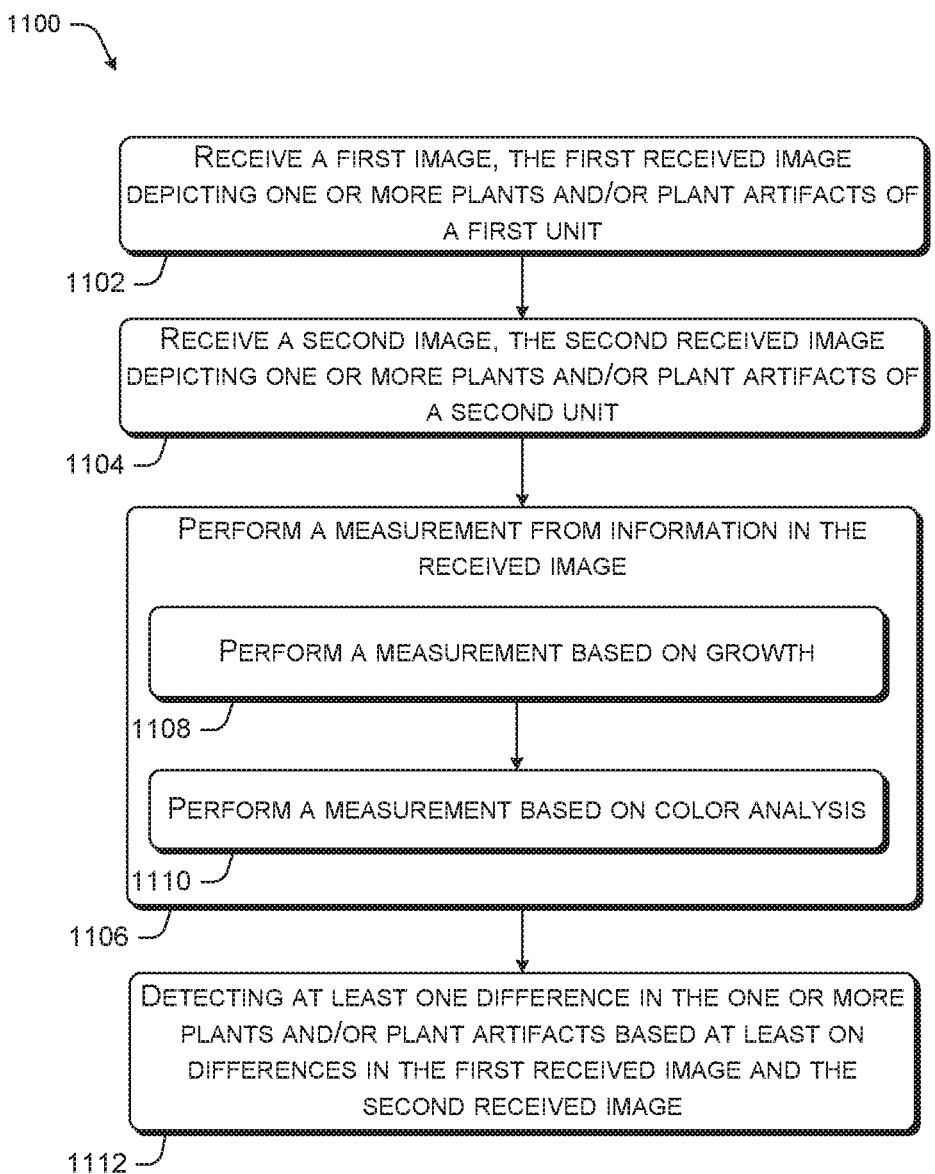
FIG. 11 is a detailed flow chart of the detection stage of the disease detection services for detecting the presence of a disease.

FIG. 11 is a detailed flow chart 1100 of the detection stage, which is based on real-time analysis not dependent on long term historical data. At block 1102, the disease detection services may receive a first image, the first received image depicting one or more plants and/or plant artifacts of a first unit. At block 1104, the disease detection services may receive, a second image, the second received image depicting one or more plants and/or plant artifacts of a second unit. The plants are of the same genus and species. The analysis provided during the detection stage is plant and disease-agnostic in that neither the plants nor the disease has to be identified.

At block 1106, the disease detection services may measure one or more metrics from information in the received images. In one instance, the metrics can include the growth rate, color, and/or other direct measurements that have been shown to be primary indicators of plant health and disease. In the case of *Pythium aphanidermatum* and *Pythium dissotocum*, the primary and initial indicator is variation in growth rate and color. To measure growth based metrics, plant count may initially be performed by counting the number of objects with an area and shape above a predetermined threshold. In some instances, flower (or fruit) count, size, color, and spacing may also be measured. In various embodiments, initial segmentation of the received images may be conducted using color zone-based segmentation method, which is relying on color analysis and transformations in YCbCr space, which accounts for various lighting conditions (e.g., greenhouse night yellowish lighting, and day-time natural lighting from the sun) and crop color varieties (e.g., bluish, dark reddish, and/or purplish appearances, and various colors of early stage leaves). In some instances, features may be extracted from the received images, which may be segmented RGB images and/or binary masks. Feature analysis can remove false positives when weeding plants or when noise is present within the current image and with similar sizes and/or shapes. Textures, the histogram of oriented gradients (HOG), and color zone ratios may be extracted from RGB images. Shapes, area count, and local binary patterns (LBP) may be extracted from binary masks.

Each of the instrumented metrics is used directly as input signals, weighted by a corresponding factor. In the case of a metric that does not apply, such as flower count for non-flowering plants, setting the weight to 0 may remove the influence of that signal during the detection stage. In various embodiments, supervised learning may be implemented over time to reduce false positives. For example, the disease detection server may be presented with an image, such as an image depicting a plant that has stunted growth caused from *Pythium*, and an output comprising a vector of values corresponding to features such as "disease" may then be produced. In some instances, it may be desirable to output a high score for some of the neurons in the output feature vector, for example, the ones corresponding to "disease." Before training, the output produced by the disease detection server may be incorrect. Thus, an error may be calculated between the actual output and the target output. The weights of the metrics may be adjusted so that the output scores of the disease detection server are more closely aligned with the target. Thus, in supervised learning, both the input and output targets are known for many exemplars and are used to modify the weights of the metrics.

At block 1108, the disease detection services may perform a measurement based on growth. The measurement may be used to calculate an overall growth rate, as well as the degree of variability in growth rate. In one example, the overall growth rate may decrease, while the degree of variability in growth rate increases if there is a presence of plant disease. At block 1110, the disease detection services may provide a measurement based on color analysis. The color analysis may apply algorithms that are suitable to detect, extract, and quantify the attribute of color. Measurement based on growth at block 1108 and measurement based on color at block 1110 may be performed at the same time or in a sequential manner. Measurement based on growth and color may be simply made and analyzed in isolation.

At block 1112, the disease detection services may detect at least one difference in the one or more plants and/or plant artifacts based at least on differences in the first received image and the second received image. The change in each metric is compared on a short baseline to preceding values from the same unit or space (e.g., a first hydroponic lane of plants), and to values from neighboring units or spaces (e.g., a second hydroponic lane of plants), to derive the real-time delta for each metric, which is then an input signal, weighted by a corresponding factor. The disease detection services may trigger on a unit variation that exceeds two standard deviations from the norm set by the associated baseline metric, or by specific thresholds determined by horticultural theory, or local experience. These trigger thresholds may be stored in a database and can be combined with the weights associated with each input signal, comprise a learning system that is then tuned initially by supervised learning, and then subsequently by unsupervised learning.

In various embodiments, the differences are identified (e.g., the darkness in color, premature browning, size difference, etc.). It is noted that the analysis is not limited to two images. Additional images may be used. Further, the images themselves may be compared as well as any metadata associated with the images and any pre-calculated or pre-generated information on the images including the plant state vector. For example, the color information in the plant state vector may be used to generate values for both the first image and the second image, and the color information may be compared. Because the images include information of artifacts comprising the respective plants, the comparison between the two images may be made of the plant as a whole and on a per artifact basis.

Figure 12:
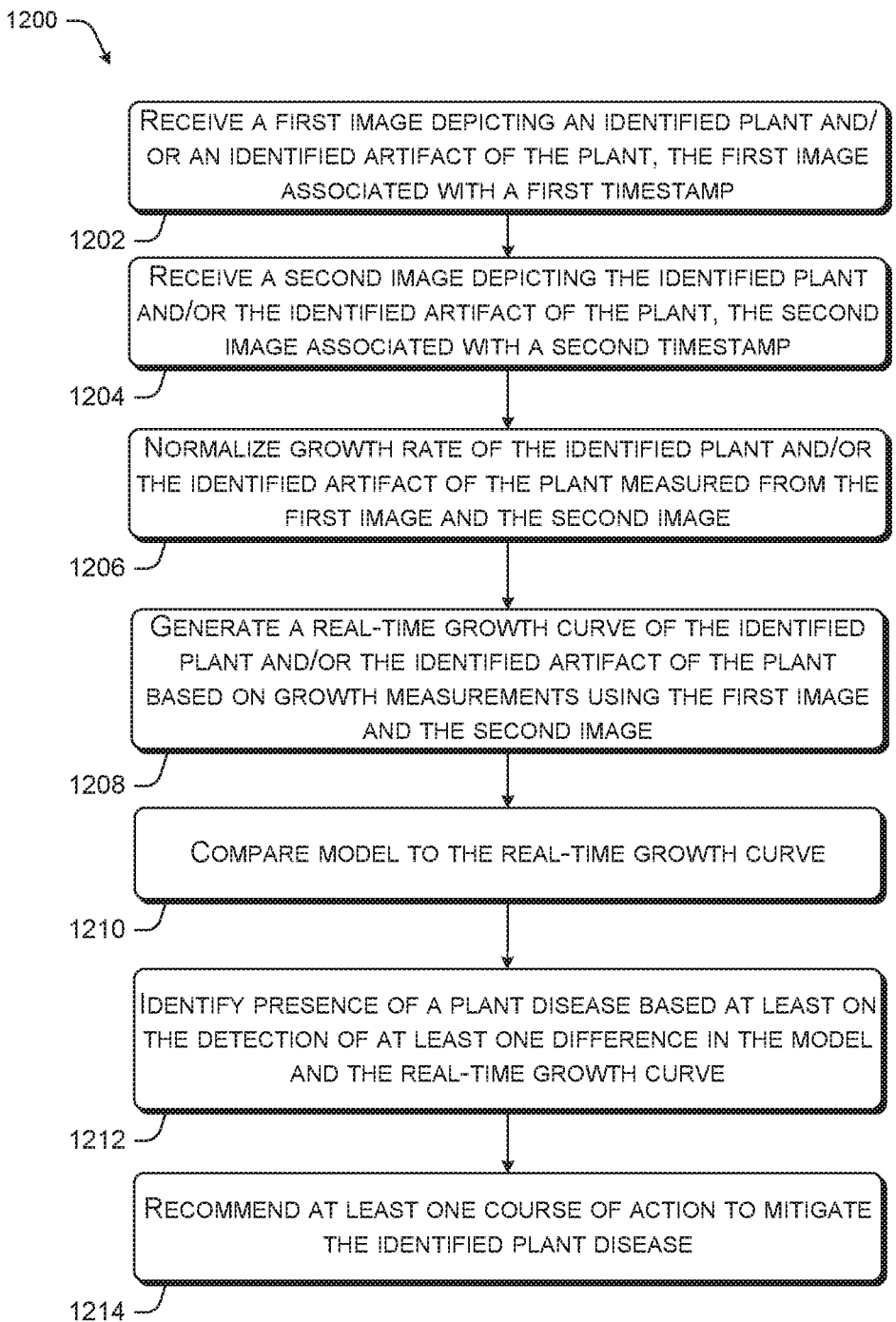
FIG. 12 is a detailed flow chart of the classification stage of the disease detection services for identifying a disease that is present.

FIG. 12 is a detailed flow chart of the classification stage, which analyzes the identified plant and an identified artifact of the plant based on a performed measurement. At block 1202, the disease detection services may receive a first image depicting an identified plant and/or an identified artifact of the plant. The image can be time stamped. Thus, the first image is associated with a first timestamp. At block 1204, the disease detection services may receive a second image depicting the identified plant and/or the identified artifact of the same plant. The second image is associated with a second timestamp. In various embodiments, validation analysis may be performed to confirm that the plants compared are indeed the same plant. In this way, comparing the two images is validated. One embodiment of validation analysis is to perform a 2+1 analysis. For the plant in the first image and the plant in the second image, a vector is generated for each plant image. Because the images are generally captured via the same image capture device, a measurement of the Euclidean distance between the plants may be calculated. Where the distance is over a predetermined threshold, a determination of whether the plant was simply moved and/or rotated may be made, thereby confirming that the plant identified in the image and second image is the same plant, and may, therefore, be compared.

At block 1206, the disease detection services may normalize the growth rate of the identified plant and/or the identified artifact of the plant measured from the first image and the second image. At block 1208, the disease detection services may generate a real-time growth curve of the identified plant and/or the identified artifact of the plant based on growth measurements using the first image and the second image. At block 1210, the disease detection services may compare a model curve to the real-time growth curve. The model curve may be retrieved from a database. Because the model curve is plant-specific, the model curve depicts a normal growth rate for the identified plant and/or the identified artifact of the plant.

At block 1212, the disease detection services may identify the presence of a plant disease based at least on the detection of at least one difference in the model and the real-time growth curve. Plant diseases may be identified based at least on the real-time growth curve using pattern recognition analyses trained to detect specific diseases in specific species. Different plant diseases may be associated with different characteristic patterns. The base metrics that are analyzed for characteristic patterns may be stored in a data store for subsequent reporting. Additionally, or alternatively, the real-time growth curve may be compared to the real-time growth curve of the plant as part of sequential analysis.

At block 1214, the disease detection services may recommend at least one course of action to mitigate the identified plant disease. In this regard, the disease detection services may access a database, which may be searched for the identified disease and/or remediation course of action. In various embodiments, the database may comprise a solutions table from which a remediation course of action may be selected based at least on the identified disease. The remediation course of action may also be selected based at least on one or more environmental factors and/or other sensor data collected via one or more sensors in a grow operation, wherein the sensors may be in communication with the disease detection services. Upon identifying at least one course of action for remediation, the disease detection services may interact directly with the horticultural management device or other components or devices used in the grow operation via the intermediate servers, and/or other interfaces to monitor the grow operation. In various embodiments, trends across an entire grow operation may be detected. Accordingly, in addition to comparing images of the same plant, comparisons may be made of similarly situated plants that may be of the same or different genus and species.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:
receiving, from one or more image capture devices, a first image depicting a first set of plants of a first unit and a second image depicting a second set of plants of a second unit;
measuring one or more metrics associated with the first set of the plants and the second set of the plants based at least on the first image and the second image, respectively;
detecting at least one difference in the first set of the plants of the first unit and the second set of the plants of the second unit based at least on differences in the measurement for the one or more metrics associated with the first set of the plants and the second set of the plants; and
in response to detecting the at least one difference in the first set of the plants of the first unit and the second set of the plants of the second unit, requesting additional images of the plants from the one or more image capture devices to detect presence of a plant disease in the first set of the plants or the second set of the plants.

2. The computer-implemented method of claim 1, further comprising:
receiving the additional images of the plants from the one or more image capture devices;
measuring the one or more metrics associated with the plants based at least on the additional images, wherein the one or more metrics comprise growth based metrics;
generating a growth curve based at least on the growth based metrics associated with the plants;

comparing a plant-specific model curve to the growth curve associated with the plants;
detecting the presence of the plant disease based at least on at least one difference in the plant-specific model curve and the growth curve; and
identifying the plant disease based at least on one or more characteristic patterns depicted in the growth curve.

3. The computer-implemented method of claim 2, further comprising:
recommending at least one course of action to mitigate the identified plant disease.

4. The computer-implemented method of claim 1, wherein the one or more metrics are unit metrics.

5. The computer-implemented method of claim 4, wherein the unit metrics comprise the growth based metrics, the growth based metrics comprising canopy coverage, flower count, flower size, flower clusters, germination count, germination size, and component shape.

6. The computer-implemented method of claim 4 wherein the unit metrics comprise color based metrics, the color based metrics comprising canopy histogram, canopy K-means color cluster size, and flower histogram.

7. The computer-implemented method of claim 1, wherein the one or more metrics are spatial aggregate metrics.

8. The computer-implemented method of claim 7, wherein the spatial aggregate metrics comprise growth based metrics, the growth based metrics comprising space specific growth homogeneity, space specific flower count homogeneity, space specific flower size homogeneity, space specific flower cluster homogeneity, space specific germination count homogeneity, space specific germination size homogeneity, and space specific germination shape homogeneity.

9. The computer-implemented method of claim 7, wherein the spatial aggregate metrics comprise color based metrics, the color based metrics comprising space specific canopy histogram homogeneity, space specific canopy K-means color cluster size homogeneity, and space specific flower color histogram homogeneity.

10. A system, comprising:
one or more non-transitory storage mediums configured to provide stored computer-readable instructions, the one or more non-transitory storage mediums coupled to one or more processors, the one or more processors configured to execute the computer-readable instructions to cause the one or more processors to:
receive, from one or more image capture devices, a first image depicting a first set of plants of a first unit and a second image depicting a second set of plants of a second unit;
measure one or more metrics associated with the first set of the plants and the second set of the plants based at least on the first image and the second image, respectively;
detect at least one difference in the first set of the plants of the first unit and the second set of the plants of the second unit based at least on differences in the measurement for the one or more metrics associated with the first set of the plants and the second set of the plants; and
in response to detecting the at least one difference in the first set of the plants of the first unit and the second set of the plants of the second unit, request additional images of the plants from the one or more image capture devices to detect presence of a plant disease in the first set of the plants or the second set of the plants.

11. The system of claim 10, wherein the one or more processors are further configured to:
receive the additional images of the plants from the one or more image capture devices;
measure the one or more metrics associated with the plants based at least on the additional images, wherein the one or more metrics comprise growth based metrics;
generate a growth curve based at least on the growth based metrics associated with the plants;
compare a plant-specific model curve to the growth curve associated with the plants;
detect the presence of the plant disease based at least on at least one difference in the plant-specific model curve and the growth curve; and
identify the plant disease based at least on one or more characteristic patterns depicted in the growth curve.

12. The system of claim 11, wherein the one or more processors are further configured to:
recommend at least one course of action to mitigate the identified plant disease.

13. The system of claim 11, wherein the one or more processors are further configured to:
perform validation analyses to confirm that the plants depicted in the additional images are the same.

14. The system of claim 11, wherein the one or more processors are further configured to:
determine an overall growth rate and a degree of variability in growth rate associated with the plants based at least on the growth based metrics.

15. One or more non-transitory computer-readable media storing computer-executable instructions that upon execution cause one or more processors to perform acts comprising:
receiving, from one or more image capture devices, a first image depicting a first set of plants of a first unit and a second image depicting a second set of plants of a second unit;
measuring one or more metrics associated with the first set of the plants and the second set of the plants based at least on the first image and the second image, respectively;
detecting at least one difference in the first set of the plants of the first unit and the second set of the plants of the second unit based at least on differences in the measurement for the one or more metrics associated with the first set of the plants and the second set of the plants; and
in response to detecting the at least one difference in the first set of the plants of the first unit and the second set of the plants of the second unit, requesting additional images of the plants from the one or more image capture devices to detect presence of a plant disease in the first set of the plants or the second set of the plants.

16. The one or more non-transitory computer-readable media of claim 15, wherein the acts further comprise:
receiving the additional images of the plants from the one or more image capture devices;
measuring the one or more metrics associated with the plants based at least on the additional images, wherein the one or more metrics comprise growth based metrics;
generating a growth curve based at least on the growth based metrics associated with the plants;
comparing a plant-specific model curve to the growth curve associated with the plants;

detecting the presence of the plant disease based at least on at least one difference in the plant-specific model curve and the growth curve; and identifying the plant disease based at least on one or more characteristic patterns depicted in the growth curve.

17. The one or more non-transitory computer-readable media of claim 16, wherein the acts further comprise:

recommending at least one course of action to mitigate the identified plant disease.

18. The one or more non-transitory computer-readable media of claim 17, wherein the acts further comprise:

propagating the at least one course of action to one or more horticultural management device.

19. The one or more non-transitory computer-readable media of claim 16, wherein the acts further comprise:

performing validation analyses to confirm that the plants depicted in the additional images are the same.

20. The one or more non-transitory computer-readable media of claim 16, wherein the acts further comprise:

determining an overall growth rate and a degree of variability in growth rate associated with the plants based at least on the growth based metrics.

* * * * *